Nov. 7, 1933.   C. B. TAYLOR   1,934,632
CONTROL SYSTEM FOR PRIME MOVER GENERATOR PLANTS
Filed March 18, 1932
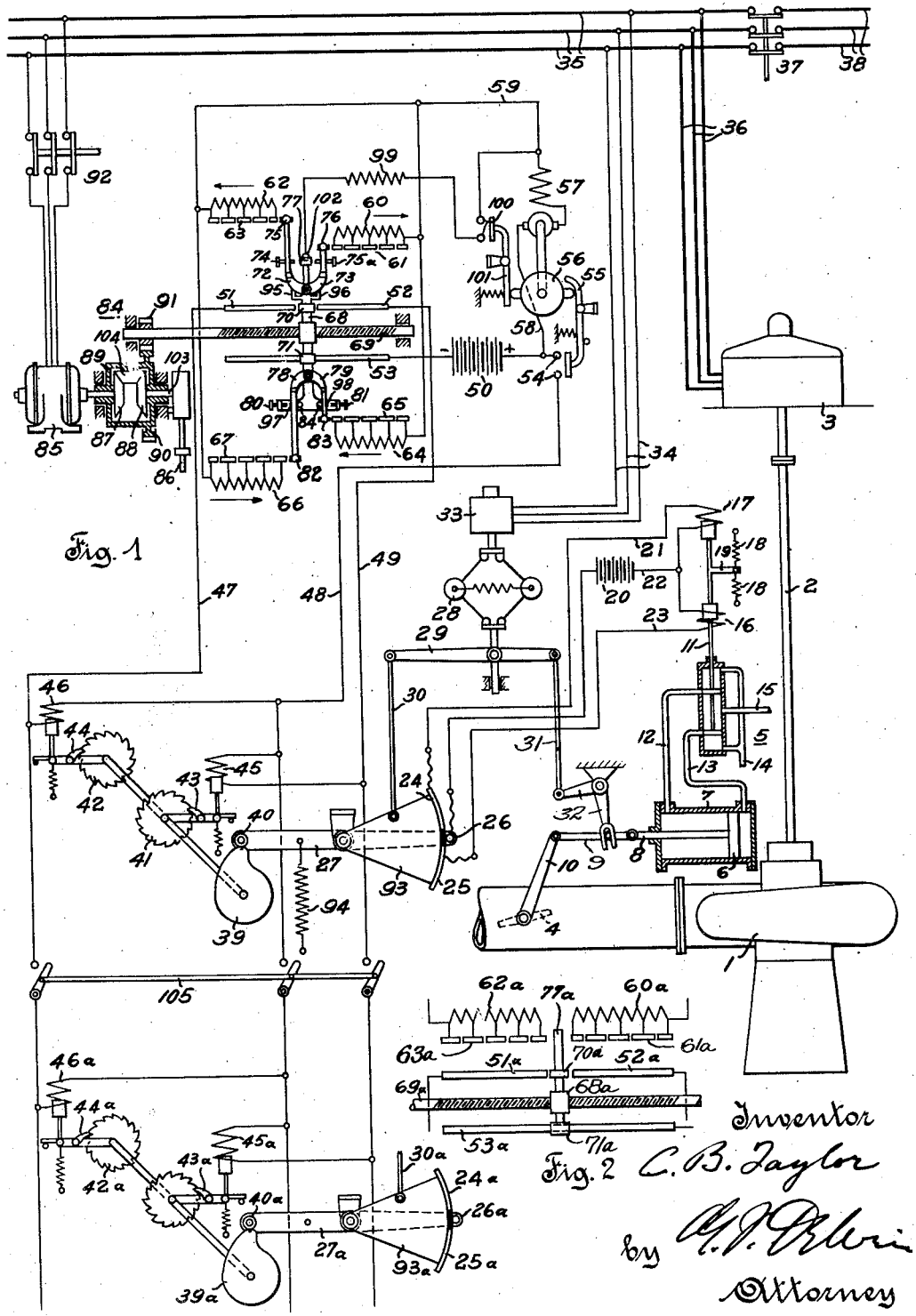

Patented Nov. 7, 1933

1,934,632

UNITED STATES PATENT OFFICE 1,934,632

CONTROL SYSTEM FOR PRIME MOVER GENERATOR PLANTS

Charles B. Taylor, Wauwatosa, Wis., assignor to Allis-Chalmers Manufacturing Company, Milwaukee, Wis., a corporation of Delaware Application March 18, 1932. Serial No. 599,690

13 Claims. (Cl. 290—4)

This invention relates in general to prime mover generator plants and more particularly to such plants in which it is desired to regulate the flow of operating fluid to the prime mover in such a way that the generator will be caused to produce alternating currents of constant frequency.

An object of this invention is to provide a control system for a prime mover generator which utilizes both a fly ball governor and a sensitive frequency responsive governor for controlling the speed of the generator.

Another object of this invention is to provide a constant frequency regulating system which produces intermittent regulating impulses, the frequency of which are directly proportional to the departure of speed of a prime mover with respect to a basic source of constant speed.

Another object of this invention is to provide a frequency responsive regulating mechanism which will cause the simultaneous actuation of the gates of a plurality of prime mover generator units in a station so that the station load will be automatically distributed among the different units in predetermined ratios.

A further object of this invention is to provide a regulating system which will cause a servomotor to actuate the gate of a prime mover upon occurrence of a deviation of prime mover speed relative to a normal predetermined speed until the speed of said prime mover returns to normal, and will then cause the servo-motor to control the gates so as to compensate for the revolutions gained or lost during said deviation.

These and other objects are obtained by this invention, various novel features of which will be apparent from the description and drawing herein, and will be more particularly pointed out in the claims.

An illustrative example of the application of this invention is shown in the accompanying drawing, in which:

Figure 1 is a diagrammatic illustration of a control system embodying the invention as it may be utilized in the control of a prime mover generator plant; and Figure 2 is a modification of a feature shown in Figure 1.

Referring now to Figure 1, of the drawing, a prime mover 1 is here indicated as a hydraulic turbine having a shaft 2 adapted to drive a generator 3. The admission of operating fluid to turbine 1 is controlled by means of a valve 4, it being understood that the turbine may be controlled by other forms of gates including the usual guide vanes and that the term "gate" will be used hereafter for the sake of brevity. Servomotor 5 is provided with piston 6, slidable in cylinder 7, and controlled by an electromagnetically operated valve having stem 11 which controls the admission of fluid under pressure from inlet pipe 15 to either of outlets 12 or 13 noting that pipe 14 serves as a drain. Piston 6 is operatively connected to gate 4 by means of piston rod 8, connecting rod 9, and lever 10. Valve stem 11 is movable upwardly by electromagnet 17 and is movable downwardly by electromagnet 16 and is held in a neutral position by means of centering springs 18 which are attached to arm 19.

Electromagnets 16 and 17 are selectively energized from battery 20 by means of contact segments 24—25 and brush contact 26 through conductors 21, 22, and 23. Contacts 24 and 25 are carried by a rotatable sector 93 and are insulated therefrom as well as from each other noting, that in the position shown they are not in contacting engagement, with contact 26. Contact 26 is carried by lever 27 and is suitably insulated therefrom. A speed governor of usual form comprises fly balls 28 which are adapted to be operated in accordance with the speed of generator 3 by means of synchronous motor 33 which is connected to generator 3 through conductors 34, 35, and 36. One end of floating lever 29 is connected to rotatable sector 93 by means of link 30. The other end of floating lever 29 is connected to lever 10 by means of link 31 and crank lever 32. A switch 37 is provided for connecting conductors 36 of generator 3 to a station bus 38 to which other generators (not shown) are also connected.

A roller 40 is carried by lever 27 and is biased into engagement with cam 39 by means of spring 94. Cam 39 is rotatable in a counter-clockwise direction by means of ratchet wheel 41 and a paul 43 which is reciprocated by electromagnet 45. Cam 39 is rotatable in a clockwise direction by means of a ratchet wheel 42 and a paul 44 which is reciprocated by electromagnet 46. Electromagnet 45 is energized from battery 50 through conductors 48 and 49 when contacts 54 are closed provided contact 70 is in engagement with contact 52. Electromagnet 46 is energized from battery 50 through conductors 47 and 48 when contacts 54 are closed, provided contact 70 is in engagement with contact 51. Contacts 54 are intermittently opened and closed by means of pivoted contact lever 55 which has one end located in the path of cam member 56. Cam member 56 is driven by a variable speed motor 57 which, as shown herein, is of the series motor type, however, it is to be understood that any other well known type of variable speed motor may be used. Motor 57 may be selectively energized from battery 50 through any one of five circuits as will hereinafter appear.

A switch device for controlling the speed of motor 57 and for controlling the energization of electromagnets 45 and 46 comprises a body member 68 adapted to be driven by a screw 69. A contact brush 70 is mechanically and electrically connected to body member 68 and is adapted to selectively engage stationary contacts 51 or 52. Another contact brush 71 is mechanically and electrically connected to body member 68 and is adapted to continually engage stationary contact 53 which is connected to the negative terminal of battery 50. The upper part of body member 68, as viewed in Figure 1, carries a pair of pivoted contact arms 72 and 73. Contact arms 72 and 73 are independently rotatable relative to body member 68, however, counter-clockwise rotation of contact arm 72 is limited by stop member 95 and clockwise rotation of contact arm 73 is limited by stop member 96. Contact arm 72 carries a contact brush 75 and an adjustable contact 74 noting that contact 74 and brush 75 are insulated from the base portion of contact arm 72. Upon movement of body member 68 to the left, as viewed in Figure 1, contact arm 72 is caused to rotate in a clockwise direction about its pivot due to the friction of contact brush 75 and to thereby cause contact 77 to move into engagement with contact 74. Upon movement of body member 68 to the right, as viewed in Figure 1, contact arm 73 is caused to rotate in a counter-clockwise direction about its pivot due to the friction of contact brush 76 and to thereby cause contact 77 to move into engagement with contact 75a. The lower part of body member 68, as viewed in Figure 1, carries a pair of pivoted contact arms 78 and 79. Contact arms 78 and 79 are independently rotatable relative to body member 68, however, counter-clockwise rotation of contact arm 78 is limited by stop member 84 and clockwise rotation of contact arm 79 is limited by stop member 84. Contact arm 78 carries a contact brush 82 and a fixed contact 97 noting that contacts 82 and 97 are insulated from the base portion of contact arm 78. Upon movement of body member 68 to the left, as viewed in Figure 1, contact arm 78 is caused to rotate in a counter-clockwise direction about its pivot due to the friction of contact brush 82 and to thereby hold contacts 80 and 97 open. Upon movement of body member 68 to the right, as viewed in Figure 1, contact arm 79 is caused to rotate in a clockwise direction about its pivot due to the friction of contact brush 83 and to thereby hold contacts 81 and 98 open.

With the apparatus in the position shown in Figure 1, contact 77 which moves in accordance with body member 68 and is electrically connected thereto is in engagement with stationary contact 102 to which resistance 99 is connected. Resistance 99 is in circuit with stopping contacts 100 which are actuated by contact lever 101 for a purpose to be hereinafter described. Upon movement of body member 68 to the left, contact brush 75 will successively engage contacts 63 which are connected to resistance 62 and contact brush 82 will successively engage contacts 67 which are connected to resistance 66. Upon movement of body member 68, to the right, contact brush 76 will successively engage contacts 61 which are connected to resistance 60 and contact brush 83 will successively engage contacts 65 which are connected to resistance 64.

Figure 2 shows a simplified form of contact mechanism which may be substituted for the contact mechanism shown in Figure 1, when extreme accuracy is not essential. In this figure, body member 68a carries contact 70a which is adapted to engage either stationary contact 51a or stationary contact 52a and also carries contact 71a which is in continual engagement with stationary contact 53a. Body member 68a also carries a contact brush 77a which is adapted to successively engage either contacts 63a which are connected to resistance 62a or to successively engage contacts 61a which are connected to resistance 60a.

Screw 69 is rotated in one direction or the other by a differential mechanism 84 which comprises a motor 85 of the synchronous type rotatable in accordance with the frequency of generator 3 when switch 92 is closed. Differential mechanism 84 also comprises a device 86 for causing the shaft 103 to operate at constant speed within extremely close limits. Mechanism 86 is preferably of the pendulum controlled type. Inasmuch as the exact nature of mechanism 86 is not essential to an understanding of the present invention, the details thereof have not been illustrated. Synchronously operated motor 85 drives a pinion 87 and constant speed shaft 103 drives pinion 88 in a direction opposite to that of pinion 87. A pinion 104 carried by rotatable frame 89 and meshing with both gears 87 and 88 causes ring gear 90 which is carried by member 89 to rotate in one direction or the other depending upon whether the speed of motor 85 is above or below the speed of shaft 103. Ring gear 90 drives shaft 69 by means of gear 91.

In a prime mover generator plant, having more than one prime mover generator and provided with apparatus embodying the present invention, each prime mover generator is provided with a servo-motor controlled gate, a fly ball governor and a ratchet-actuated cam for controlling the actuation of the servo-motor of precisely the same type shown in Figure 1. In Figure 1, a portion of the control apparatus for a second prime mover generator is illustrated noting that electromagnets 45a and 46a are connected in parallel with electromagnets 45 and 46, respectively, when switch 105 is closed. It is thus seen that with switch 105 closed electromagnets 45a and 46a will cause cam 39a to rotate synchronously with cam 39. Cam 39a, however, will not necessarily have the same contour as cam 39 inasmuch as it may be desirable to cause certain of the prime mover generators to take different proportions of the total load as the total load on the station changes. It is to be understood that the contour of cams 39 and 39a and other cams associated with the respective prime mover generators will be laid out in conformity with the power characteristic curve of the various prime movers so that the proportional distribution of load to each unit will maintain a maximum over-all efficiency of the plant. It is thus seen that a single frequency governor may control the distribution of load among a plurality of prime mover generators.

The operation of the system shown in Figure 1 is as follows. The position of the apparatus shown in Figure 1 corresponds to approximately full load on generator 3 while operating at exactly the correct desired speed. Upon occurrence of a small increase in load (insufficient to cause fly ball governor 28 to actuate servo-motor 5) the speed of generator 3, and consequently, the frequency on generator bus 35 will drop slightly thereby causing the shaft of motor 85 to drop back in angular position relative to constantly rotating shaft 103 thereby causing the differential mechanism to rotate shaft 69 in such a direction as to cause body member 68 to move toward the left. After a predetermined movement of body member 68, contact arm 74 will engage contact 77 and then contact 77 will mechanically move contact arm 72 to the left so that contact brush 75 will engage certain of the stationary contacts 63 depending upon the magnitude of the changing speed of generator 3. At substantially the same time that contact 75 engages contacts 63 or slightly later, body member 68 will have moved to the left sufficiently to cause contact brush 70 to engage contact strip 51 thereby partially closing a circuit to electromagnet 46 through conductors 47 and 48 which circuit is intermittently completed by contacts 54 as soon as motor 57 starts operating. Motor 57 is energized upon engagement of contact 75 with contacts 63 through a circuit including resistance 62, conductor 59, motor 57, conductor 58, battery 50, contacts 53—71, through the body member 68, through contacts 77—74 to contact 75. The intermittent energization of electromagnet 46 will notch cam 39 in a clockwise direction thereby permitting spring 94 to move contact brush 26 into engagement with contact segment 24. The circuit established by the closure of contacts 24 and 26 energizes electromagnet 17 from battery 20, through conductors 21 and 22, thereby raising valve stem 11 to admit fluid under pressure to the left hand side of piston 6 and thereby causing gate 4 to open wider. Body member 68 will continue to move to the left until gate 4 has been opened sufficiently to cause the speed of generator 3 to increase to such an extent that the shaft of motor 85 rotates at the same speed as shaft 103, however, with body member 68 displaced to the left intermittent energization of electromagnet 46 will continue until the gate has been opened to such a position that the speed of motor 85 is slightly above the speed of constantly rotating shaft 103. This difference in speeds causes shaft 69 to rotate in an opposite direction thereby immediately stopping motor 57 by opening contacts 74 and 77. However, motor 57 will be energized after frame member 68 moves a slight distance to the right at which time contacts 80 and 97 will close thereby establishing an energizing circuit for motor 57 from negative terminal battery 50 through contact strip 53, contact 71, contact 97, contact 80, contact brush 82, stationary contact 67, a portion of resistance 66, conductor 59, motor 57, conductor 58, back to the positive terminal of battery 50. Motor 57 will, therefore, continue to intermittently open and close contacts 54 thereby causing cam 39 to continue movement in a clockwise direction and to thus cause gate 4 to open wider. It is to be understood that gate 4 will not necessarily be continually moved towards the full position, but that due to the relay connection from lever 10 through crank lever 32, link 31, floating lever 29, and link 30, to sector member 93, this sector member will be actuated to successively restore contacts 24 and 25 to their neutral position so that valve stem 11 will be intermittently actuated. As body member 68 approaches the neutral position shown in Figure 1, the amount of resistance 66 in circuit with motor 57 will gradually be increased to such a value that motor 57 will operate at a very low speed thereby causing very slow movement of cam 39. When body member 68 returns to the position shown in Figure 1, the circuit for electromagnet 46 will be broken by contact 70, however, motor 57 will continue to operate due to the circuit established by the closure of contacts 77 and 102, which establishes a circuit for motor 57 through resistance 99 and stopping contacts 100. The purpose of stopping contacts 100 is to assure that motor 57 will stop in such a position that contacts 54 are in their open position preparatory to repetition of the above cycle of operations.

It is to be understood that with switch 105 closed, solenoid 46a will be energized at the same time solenoid 46 is energized, so that cam 39a will be rotated synchronously with cam 39. Thus the other prime mover generators in the plant will have their gates actuated to an extent dependent upon the contour of cams such as 39 and 39a. Inasmuch as the position of the gates associated with the various prime movers is a measure of the load on that prime mover, it will be seen that the load on the various prime mover generators may be distributed in accordance with the contour of the various cams. It is to be understood that upon occurrence of a large increase of load that fly ball governor 28 will act in the usual manner to rapidly open gate 4, however, the fly ball governor may be entirely omitted in instances where the prime mover generator is not subject to wide variations of load, because the frequency responsive governor is quite capable of maintaining gate 4 in such a position that substantially constant frequency for long periods of time is maintained for any load on said prime mover within the capacity thereof. If the fly ball governor is omitted the movement of sector member 93 must still be relayed from gate 4 by suitable linkage.

A control system embodying the contact mechanism shown in Figure 2 will operate substantially the same as above described except that during the return movement of body member 68 the motor 57 will not be slowed down as much as in the system shown in Figure 1 because, in Figure 2, the same resistance is utilized for controlling the speed of motor 57 during return movement of body member 68 as during movement thereof from the neutral position.

Upon occurrence of a decrease in the load on the station generator 3, body member 68 will be caused to move to the right, as viewed in Figure 1, and the succeeding operations will follow substantially the same cycle hereinabove described except that electromagnets 45 and 16 will be intermittently energized instead of 46 and 17.

It should be understood that it is not desired to limit the invention to the exact details of construction shown and described, for obvious modifications may occur to persons skilled in the art.

It is claimed and desired to secure by Letters Patent:

1. In a prime mover generator plant having an alternating current generator supplying energy to a line, the combination of a gate for controlling the admission of operating fluid to said prime mover, a servo-motor for actuating said gate, an electric switch having cooperating contacts independently movable from a neutral position to control the direction of operation of said servo-motor, a flyball governor operable in response to a predetermined variation in speed of said prime mover to move certain of said cooperating contacts, means actuated in accordance with the movement of said gate for restoring said cooperating contacts to their neutral position, and a second governor mechanism operable concomitantly with said flyball governor mechanism in response to a departure in frequency of said generator relative to a standard frequency to move certain other of said cooperating contacts, said second governor mechanism comprising means for restoring said cooperating contacts to their neutral position when the cycles gained or lost during said departure have been corrected.

2. In a prime mover generator plant having an alternating current generator supplying energy to a line, the combination of a gate for controlling the admission of operating fluid to said prime mover, a servo-motor for actuating said gate, means operable from a neutral position to control the direction of operation of said servo-motor, a flyball governor arranged to actuate said means from its neutral position in response to a variation speed of said generator, a plural element differential device, means for rotating one of said elements at a constant speed, an electric motor arranged to rotate another of said elements at speeds proportional to the speed of said generator, a rheostat device actuated by a third element of said differential device, and means controlled by said rheostat device upon a departure of the frequency of said generator relative to said constant speed means for causing said servo-motor controlling means to move from its neutral position an amount proportional to the magnitude of said frequency departure, and means actuated in accordance with the movement of said gate tending to restore said servo-motor controlling means to its neutral position, said rheostat device comprising means for restoring said servo-motor controlling means to its neutral position when the cycles gained or lost during said departure have been corrected.

3. In a prime mover generator plant having an alternating current generator supplying energy to a line, the combination of a gate for controlling the admission of operating fluid to said prime mover, a servo-motor for actuating said gate, switching mechanism comprising independently movable members carrying cooperating contacts arranged to control the direction of operation of said servo-motor when one of said movable members is moved relative to the other, a speed responsive governor mechanism arranged to control the movement of one of said movable members, and a frequency responsive governor mechanism arranged to control the movement of the other of said movable members concomitantly with said speed responsive governor mechanism.

4. In a prime mover generator plant having an alternating current generator supplying energy to a line, the combination of a gate for controlling the admission of operating fluid to said prime mover, a servo-motor for actuating said gate, switching mechanism comprising independently movable members carrying cooperating contacts arranged to control the direction of operation of said servo-motor when one of said movable members is moved relative to the other, a speed responsive governor mechanism comprising a flyball governor driven in accordance with the speed of said generator and arranged to control the movement of one of said members and also comprising relay linkage actuated in accordance with the movement of said gate to restore said cooperating contacts to a neutral position, and frequency responsive governor mechanism arranged to control the movement of the other of said movable members concomitantly with said speed responsive governor mechanism.

5. In a prime mover generator plant, a gate for controlling the admission of operating fluid to said prime mover, a servo-motor for actuating said gate, an electromagnetically actuated valve for controlling said servo-motor, a cam actuated switch for controlling said valve, a plurality of electromagnetically actuated notching devices for rotating said cam actuated switch, a shaft rotating at constant speed, a switch for intermittently interrupting the energization of said notching devices, means responsive to the difference in speed between said shaft and said generator for selectively energizing said notching devices, and means controlled by said last mentioned means for varying the frequency of interruption of said intermittent switch.

6. In a prime mover generator plant a gate for controlling the admission of operating fluid to said prime mover, a servo-motor for actuating said gate, electromagnetically actuated means for controlling the direction of operation of said servo-motor a switch for controlling the actuation of said electro-magnetically actuated means, said switch having a neutral position, frequency responsive governor mechanism for controlling the operation of said switch comprising a shaft rotating at constant speed and comprising means operable upon a departure in the frequency of said generator relative to the speed of said shaft for actuating said switch an extent dependent upon the magnitude of said departure and means actuated in accordance with the movement of said gate for moving said switch in a direction opposite to the movement thereof by said governor mechanism so that said switch is restored to its neutral position when the frequency of said generator is restored to normal.

7. In a prime mover generator plant a gate for controlling the admission of operating fluid to said prime mover, a servo-motor for actuating said gate, electromagnetically actuated means for controlling the direction of operation of said servo-motor, a switch for controlling the actuation of said electromagnetically actuated means, said switch having a neutral position, frequency responsive governor mechanism for controlling the operation of said switch comprising a shaft rotating at constant speed and comprising means responsive to a departure in the frequency of said generator relative to the speed of said shaft for actuating said switch, said governor mechanism also comprising a variable speed intermittent circuit interrupter for causing said switch to move to an extent dependent upon the magnitude of said departure and means actuated in accordance with the movement of said gate for moving said switch in a direction opposite to the movement thereof by said governor mechanism so that said switch is restored to its neutral position when the frequency of said generator is restored to normal.

8. In a prime mover generator plant having more than one prime mover generator, a gate for each prime mover, an electrically controlled servo-motor for actuating each gate, a switch operable from a neutral position to control the direction of operation of each of said servo-motors, means actuated by each gate for restoring said switches to their neutral positions, a cam for operating each of said switches, and a single master governor mechanism for simultaneously actuating all of said cams in response to a departure in frequency of one of said generators relative to a predetermined frequency.

9. In a prime mover generator plant having more than one prime mover generator, a gate for each prime mover, an electrically controlled servo-motor for actuating each gate, a switch operable from a neutral position to control the direction of operation of each of said servo-motors, means actuated by each gate for restoring said switches to their neutral positions, a cam for operating each of said switches, and a single master governor for simultaneously actuating all of said cams, said governor comprising a differential device driven by a shaft rotating at constant speed and by a motor running synchronously relative to the frequency of one of said generators, and also comprising contacts selectively energized by said differential device to control the direction of operation of said cams.

10. In a prime mover generator plant having more than one prime mover generator, a gate for each prime mover, a servo-motor for actuating each gate, means comprising a cam actuated device operable from a neutral position for controlling the direction of operation of each servo-motor, means actuated by each gate for restoring each cam actuated device to its neutral position, a cam for operating each cam actuated device, and means comprising a single frequency responsive governor for simultaneously actuating all of said cams so that the load on said plant is distributed among said generators in accordance with the shape of the respective cams.

11. In a prime mover generator plant having more than one prime mover generator, a gate for each prime mover, a servo-motor for actuating each gate, means comprising a cam actuated device operable from a neutral position for controlling the direction of operation of each servo-motor, means actuated by each gate for restoring each cam actuated device to its neutral position, a cam for operating each cam actuated device, and means responsive to a reparture of the frequency of said generators from a predetermined constant frequency for simultaneously actuating all of said cams so that the load carried by said plant is divided among said generators in accordance with the shape of the respective cams.

12. In a prime mover generator plant having more than one prime mover generator, a gate for each prime mover, a servo-motor for actuating each gate, means comprising a cam actuated device operable from a neutral position for controlling the direction of operation of each servo-motor, means actuated by each gate for restoring each cam actuated device to its neutral position, a cam for operating each cam actuated device, means actuated upon a change in the frequency of said generators relative to a predetermined constant frequency due to a change of load on said plant for simultaneously actuating all of said cams so that the load carried by said plant is divided among said generators in accordance with the shape of said cams, and means responsive to the magnitude of said change in frequency for controlling the rate of actuation of said cams.

13. In a prime mover generator plant having a gate for controlling the admission of operating fluid to said prime mover, a servo-motor for actuating said gate, a cam for controlling the direction of operation of said servo-motor, means comprising a pair of ratchet devices for selectively operating said cam in different directions, a constant speed device, means responsive to the difference in speed of said generator and said device for energizing one or the other of said ratchet devices, means for intermittently interrupting the energization of said one or the other of said ratchet devices with an increasing periodicity as the speed of said generator departs from the speed of said device until the speed of said generator equals the speed of said device, and for thereafter intermittently interrupting the energization of one or the other of said devices with a decreasing periodicity to compensate for the revolutions of said generator gained or lost during said departure in speed.

CHARLES B. TAYLOR.